United States Patent
Yamada et al.

(10) Patent No.: US 7,104,258 B2
(45) Date of Patent: Sep. 12, 2006

(54) GENERAL-PURPOSE ENGINE

(75) Inventors: Yoshikazu Yamada, Saitama (JP); Shosaku Chiba, Saitama (JP); Katsuya Tajima, Saitama (JP); Eiichi Utsugi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 10/993,144

(22) Filed: Nov. 22, 2004

(65) Prior Publication Data
US 2005/0121004 A1   Jun. 9, 2005

(30) Foreign Application Priority Data
Dec. 4, 2003 (JP) .............................. 2003-405426
Dec. 4, 2003 (JP) .............................. 2003-405428

(51) Int. Cl.
*F02M 37/04* (2006.01)
(52) U.S. Cl. ................ 123/516; 123/518; 123/519
(58) Field of Classification Search ................ 123/516, 123/518, 519, 520
See application file for complete search history.

(56) References Cited

U.S. PATENT DOCUMENTS

| | | | |
|---|---|---|---|
| 3,884,204 A | | 5/1975 | Krautwurst et al. |
| 4,416,108 A | * | 11/1983 | Ghandhi ..................... 56/17.5 |
| 4,862,856 A | | 9/1989 | Yokoe et al. |
| 5,704,337 A | | 1/1998 | Stratz et al. |
| 5,894,833 A | | 4/1999 | Kikuchi et al. |

FOREIGN PATENT DOCUMENTS

JP          7-34985          2/1995

* cited by examiner

*Primary Examiner*—Thomas Moulis
(74) *Attorney, Agent, or Firm*—Arent Fox PLLC

(57) ABSTRACT

A general-purpose engine includes a canister which adsorbs fuel vapor that has evaporated within a fuel tank. The fuel vapor is desorbed from the canister and guided to an intake system communicating with an engine main body. The engine main body includes a crankcase and a cylinder block joined to the crankcase to have an upwardly inclined cylinder axis (C). The canister is disposed to one side of the crankcase and beneath the cylinder block to avoid any increase in the dimensions of the general-purpose engine.

4 Claims, 8 Drawing Sheets

US 7,104,258 B2

GENERAL-PURPOSE ENGINE

RELATED APPLICATION DATA

The Japanese priority application Nos. 2003-405426 and 2003-405428 upon which the present application is based are hereby incorporated in their entirety herein by reference.

BACKGROUND OF THE INVENTION

1. Field of the Invention

The present invention relates to a general-purpose engine including a canister for adsorbing fuel vapor that has evaporated within a fuel tank, wherein the fuel vapor desorbed from the canister is guided to an intake system communicating with an engine main body.

2. Description of the Related Art

A general-purpose engine having a canister disposed within a tank cap of a fuel tank is known from, for example, Japanese Patent Application Laid-open No. 7-34985.

Usually, a general-purpose engine needs to be compact in size so that a work machine does not become too large. However, in the conventional general-purpose engine, wherein the canister is disposed within the tank cap, the area around the tank cap becomes undesirably enlarged.

SUMMARY OF THE INVENTION

The present invention has been achieved with the above-mentioned facts, and it is an aspect of the present invention to provide a general-purpose engine wherein a canister is provided without increasing the overall dimensions of the general-purpose engine.

In accordance with an aspect of the present invention, there is provided a general-purpose engine including a canister for adsorbing fuel vapor that has evaporated within a fuel tank. The fuel vapor desorbed from the canister is guided to an intake system communicating with an engine main body. The engine main body includes a crankcase and a cylinder block joined to the crankcase to have an upwardly inclined cylinder axis. The canister is disposed on one side of the crankcase and beneath the cylinder block.

Since the canister is disposed in an empty space formed beneath the cylinder block and has a cylinder axis inclined upward, the canister is able to be arranged as such while avoiding any increase in the overall dimensions or size of the general-purpose engine. Moreover, because the overall dimensions of the general-purpose engine do not increase, even if the capacity of the canister is increased, the adsorption properties of the canister are improved without increasing the overall dimensions of the general-purpose engine.

Furthermore, in accordance with another aspect of the present invention, the engine main body of the general-purpose engine includes a cylinder head joined to a head portion of the cylinder block. As such, the intake system and an exhaust system are connected to mutually opposite sides of the cylinder head. A charge pipeline, which guides the fuel vapor from the fuel tank, and a purge pipeline, which guides the fuel vapor desorbed from the canister, are connected to a part of a casing of the canister facing the intake system side.

Since the charge pipeline and the purge pipeline are connected to the casing of the canister on the intake side, where exhaust heat from the engine main body has little influence, the exhaust heat is prevented from affecting adsorption and desorption of the fuel vapor in the canister, which improves the efficiency of the canister.

In accordance with yet another aspect of the present invention, the fuel tank of the general-purpose engine includes a removable tank cap. A fuel vapor passage communicating with the interior of the fuel tank is formed between the tank cap and the fuel tank. A pipeline that forms a part of a charge pipeline for guiding fuel vapor from the interior of the fuel tank to the canister and has one end connected to the fuel vapor passage is arranged within the fuel tank to extend through the interior of the fuel tank. Because the pipeline forming a part of the charge pipeline is arranged within the fuel tank, the portion of the charge pipeline exposed to the outside is reduced; the overall dimensions of the general-purpose engine, and consequently, the dimensions of a work machine, are reduced; the ease of mounting and the appearance of the general-purpose engine are enhanced; the salability is improved; and the overall safety, taking into consideration the leakage of fuel vapor, damage to the pipelines, etc., is also enhanced.

Furthermore, in accordance with yet another aspect of the present invention, an external communication passage of the general-purpose engine, which communicates with the outside, is formed within the tank cap. A one-way valve is provided within the tank cap, wherein the one-way valve opens when a pressure within the fuel tank is lower than an external pressure to provide communication between the external communication passage and the interior of the fuel tank. With this arrangement, even when the airflow resistance of a route from the charge pipeline through the canister to the intake system is increased due to the adsorption of the fuel vapor or the build up of impurities in the canister, by operating the one-way valve, the pressure within the fuel tank is prevented from becoming negative. Accordingly, fuel from the fuel tank is smoothly supplied even if the fuel level within the fuel tank decreases.

The above-mentioned aspects, other aspects, characteristics, and advantages of the present invention will become apparent from an explanation of preferred embodiments described in detail below with reference to the attached drawings.

DESCRIPTION OF THE PREFERRED EMBODIMENTS

Figure 1:
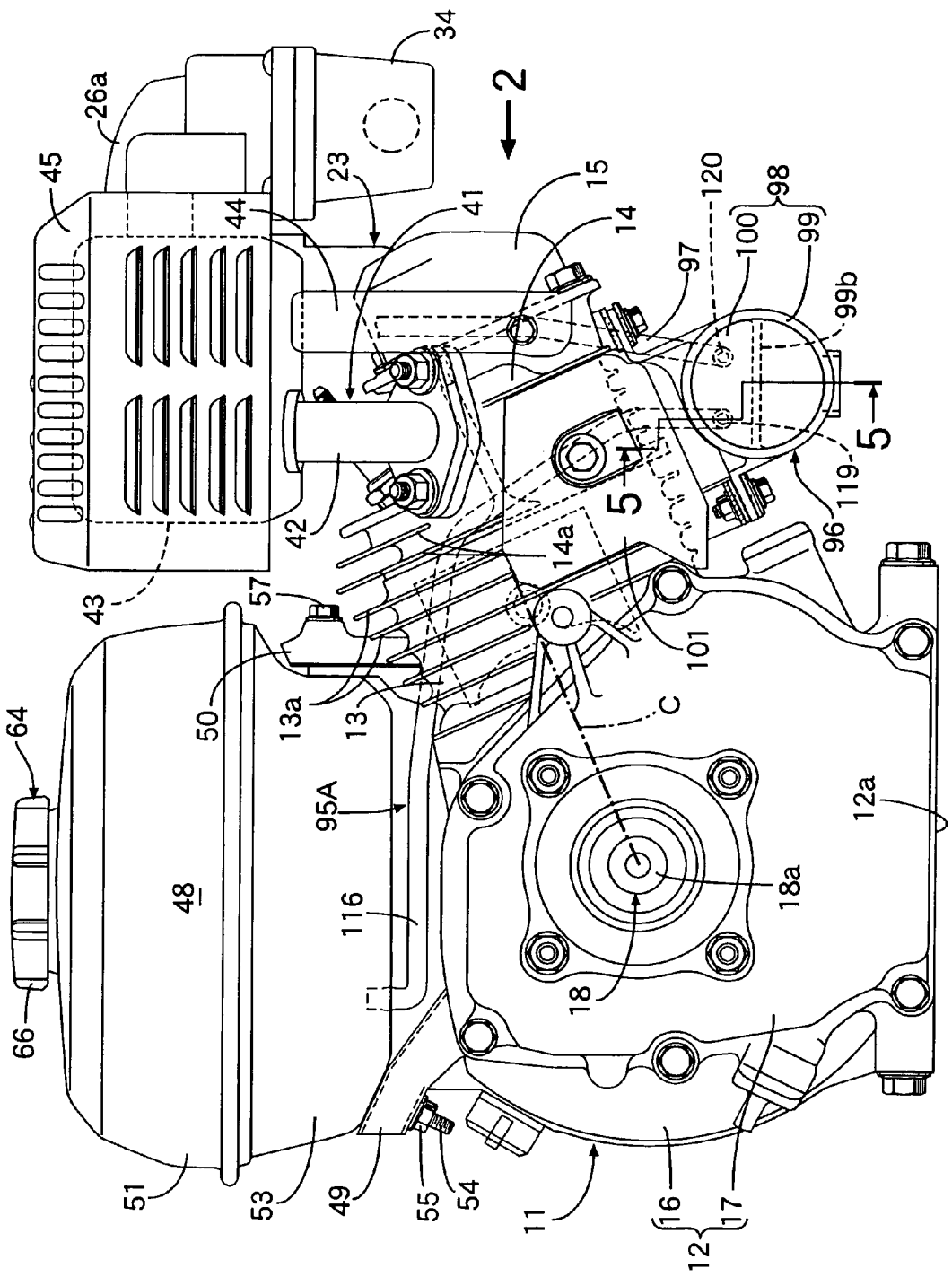
FIG. 1 is a front view of an engine according to a preferred embodiment of the present invention.
Figure 2:
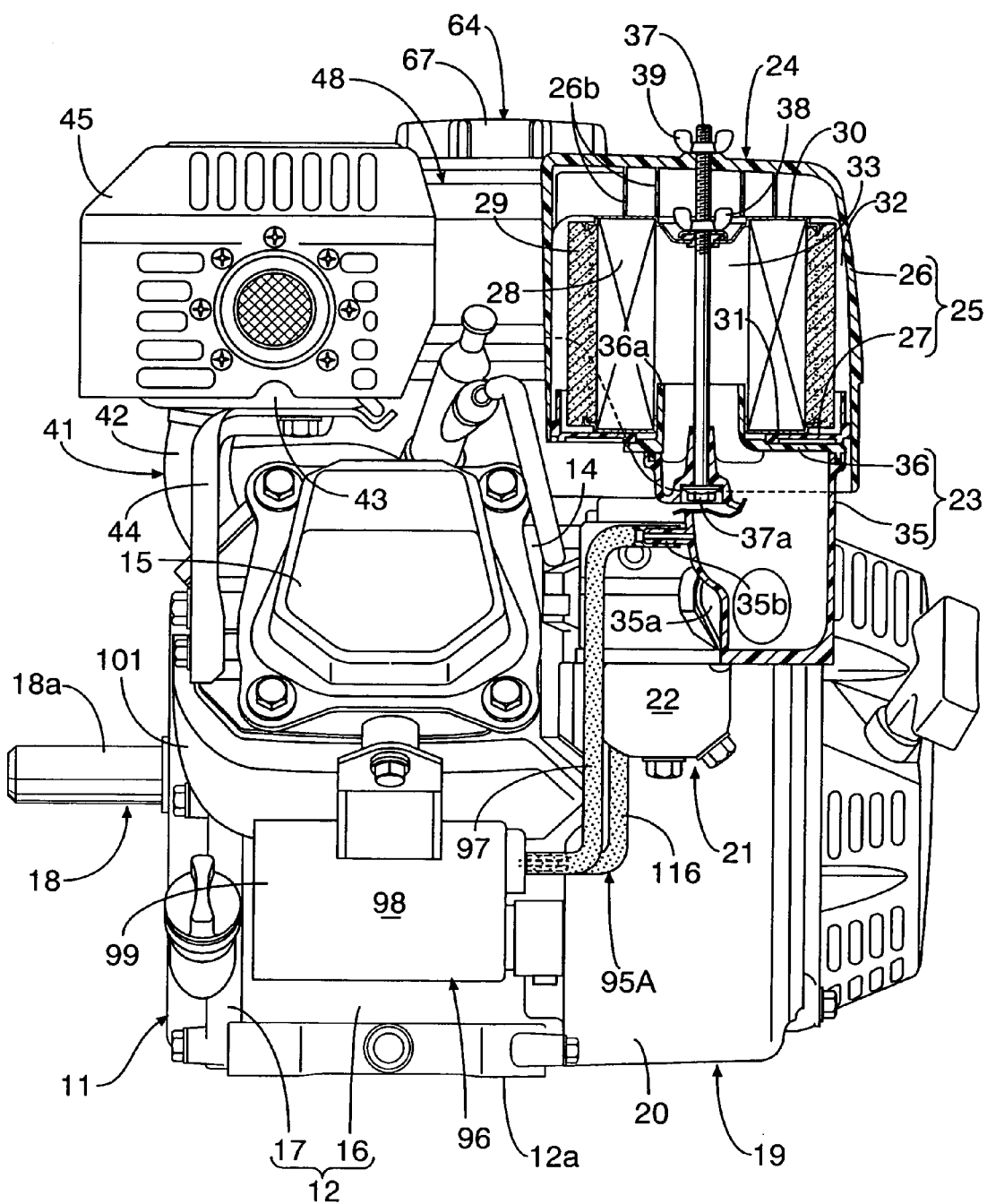
FIG. 2 is a partially cutaway side view of the engine when viewed from the direction of arrow 2 in FIG. 1.

Referring to the preferred embodiment of the present invention, which is illustrated in FIGS. 1 to 5, a general-purpose engine is an air-cooled single-cylinder engine used in, for example, a work machine. An engine main body 11 includes a crankcase 12, a cylinder block 13, and a cylinder head 14. The cylinder block 13 is joined to one side of the crankcase 12 and has an upwardly inclined cylinder axis C. The cylinder head 14 is joined to a head portion of the cylinder block 13. A plurality of air cooling fins 13a and 14a are provided on outer surfaces of the cylinder block 13 and the cylinder head 14. The crankcase 12 is mounted on an engine bed via a mounting face 12a on a lower surface of the crankcase 12. A head cover 15 is joined to the cylinder head 14 for covering a valve operating system (not illustrated).

The crankcase 12 is formed from a case main body 16 and a side cover 17. The case main body 16 is integrally cast-molded with the cylinder block 13. The side cover 17 is joined to an open end of the case main body 16. One end 18a of a crankshaft 18, which has a horizontal axis and is rotatably supported in the crankcase 12, projects from the side cover 17. A case 20 of a recoil starter 19 is mounted on the case main body 16 on a side opposite the side cover 17 and can be connected to the other end of the crankshaft 18.

An intake system 21 of the engine includes a carburetor 22, an intake pipe 23, and an air cleaner 24. The carburetor 22 is disposed to one side of the recoil starter 19 and is connected to the cylinder head 14 of the engine main body 11. A downstream end of the intake pipe 23 is connected to the carburetor 22, while an upstream end of the intake pipe 23 is connected to the air cleaner 24.

A cleaner case 25 of the air cleaner 24 includes a cleaner case main body 26 and a cover plate 27. The cleaner case main body 26 is formed into a bowl shape opening downward. The cover plate 27 closes a lower open end of the cleaner case main body 26. A cylindrical first cleaner element 28 and a cylindrical second cleaner element 29, which coaxially surrounds the first cleaner element 28, are housed within the cleaner case 25. Opposite ends, in the axial direction of the first and second cleaner elements 28 and 29, are supported by a pair of disc-shaped retaining plates 30 and 31, respectively. Both cleaner elements 28 and 29 are housed within the cleaner case 25 wherein one of the retaining plates 31 abuts against the cover plate 27.

An interior of the cleaner case 25 is divided by the cleaner elements 28 and 29 into an uncleaned chamber 32 on the outer side and a cleaned chamber 33 on the inner side. An inlet pipe portion 26a, which communicates with the uncleaned chamber 32, is integrally provided with the case main body 26 of the cleaner case 25. An inlet pipe 34 is connected to the inlet pipe portion 26a and feeds external air into the uncleaned chamber 32.

The external air fed into the uncleaned chamber 32 through the inlet pipe 34 and the inlet pipe portion 26a is cleaned while passing through the second cleaner element 29 and the first cleaner element 28, and is then guided to the cleaned chamber 33. The cleaned air within the cleaned chamber 33 is guided to the carburetor 22 through the intake pipe 23.

The intake pipe 23 extends downward from the air cleaner 24 and is formed from a pipe 35 and a cover 36. The pipe 35 extends vertically with an open upper end, and has, in a lower part, an integral connecting pipe portion 35a connected to the carburetor 22. The cover 36 closes an upper end opening of the pipe 35 and abuts against a bottom of the cover plate 27. A feed pipe portion 36a is integrally provided with the cover and extends through central parts of the cover plate 27 and the retaining plate 31 and projects into the interior of the cleaned chamber 33 from below.

An increased diameter head portion 37a of a bolt 37 engages the pipe 35 from below, while the remainder of the bolt 37 extends through the pipe 35, the feed pipe portion 36a of the cover 36, the retaining plate 30, and the upper closed end of the cleaner case main body 26. A wing nut 38 is screwed onto a threaded portion of the bolt 37 and engages the retaining plate 30 from above. Tightening the wing nut 38 establishes a unit including the first and second cleaner elements 28 and 29, the cover plate 27 of the cleaner case 25, and the intake pipe 23, all of which are held between the retaining plates 30 and 31. A plurality of ribs 26b are provided at the closed upper end of the cleaner case main body 26 of the cleaner case 25, and abut against the retaining plate 30 from above. Screwing and tightening a wing nut 39 onto a threaded portion of the bolt 37 projecting upward from the closed upper end of the cleaner case main body 26 completes assembly of the air cleaner 24, thus connecting the air cleaner 24 to the intake pipe 23.

An exhaust system 41 of the engine includes an exhaust pipe 42 and an exhaust muffler 43 which is covered with a cover 45. The exhaust pipe 42 is connected to the cylinder head 14 of the engine main body 11 on the side opposite the carburetor 22. The exhaust muffler 43 is connected to the exhaust pipe 42 and is supported by a bracket 44 that is attached to the cylinder head 14 of the engine main body 11.

That is, the intake system 21 and the exhaust system 41 are connected to mutually opposite sides of the cylinder head 14 of the engine main body 11.

A fuel tank 48 is disposed above the crankcase 12 of the engine main body 11. The fuel tank 48 is supported by support arms 49 and 50. The support arm 49 is integrally provided with the case main body 16 of the crankcase 12. The support arm 50 is integrally provided with the cylinder block 13.

Figure 3:
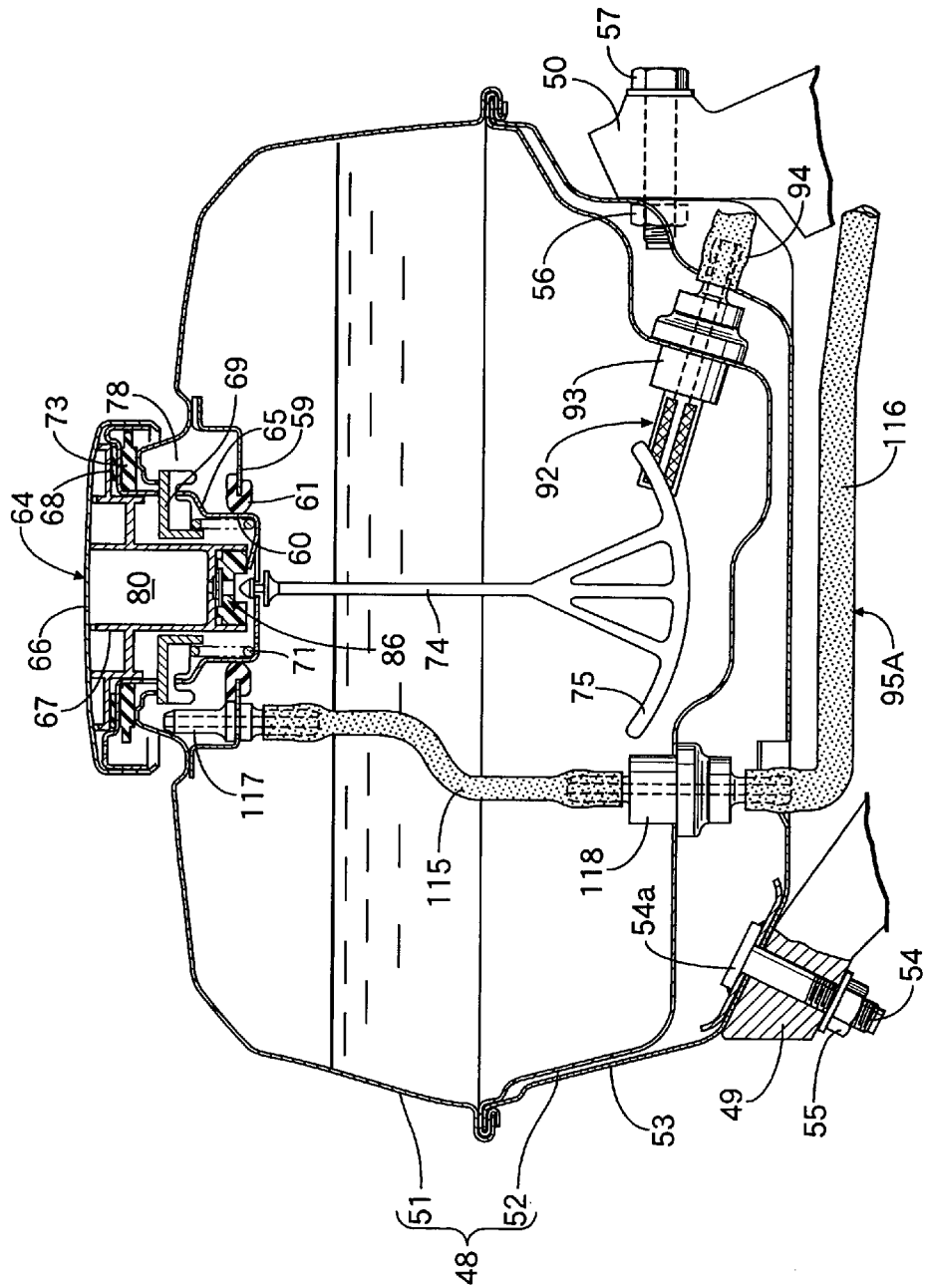
FIG. 3 is a vertical sectional view of a fuel tank of the engine.

In FIG. 3, the fuel tank 48 is formed by joining the peripheral edge of an upper tank half 51 and the peripheral edge of a lower tank half 52 to each other. The upper tank half 51 is formed into a bowl shape opening downward. The lower tank half 52 is formed into a bowl shape opening upward. The peripheral edge of a support cover 53 is joined to the peripheral edges of the upper and lower tank halves 51 and 52. The support cover 53 is formed in a bowl shape opening upward to cover the lower tank half 52 from below.

Secured to an inner face of the support cover 53 are a weld nut 56 and a head 54a of a bolt 54 inserted through the support cover 53 and the support arm 49. A nut 55 is screwed onto a threaded portion of the bolt 54 projecting from the support arm 49. A bolt 57 inserted through the support arm 50 and the support cover 53 is screwed into the weld nut 56. Tightening the nut 55 and the bolt 57 enables the support cover 53, that is, the fuel tank 48, to be supported by the engine main body 11.

Figure 4:
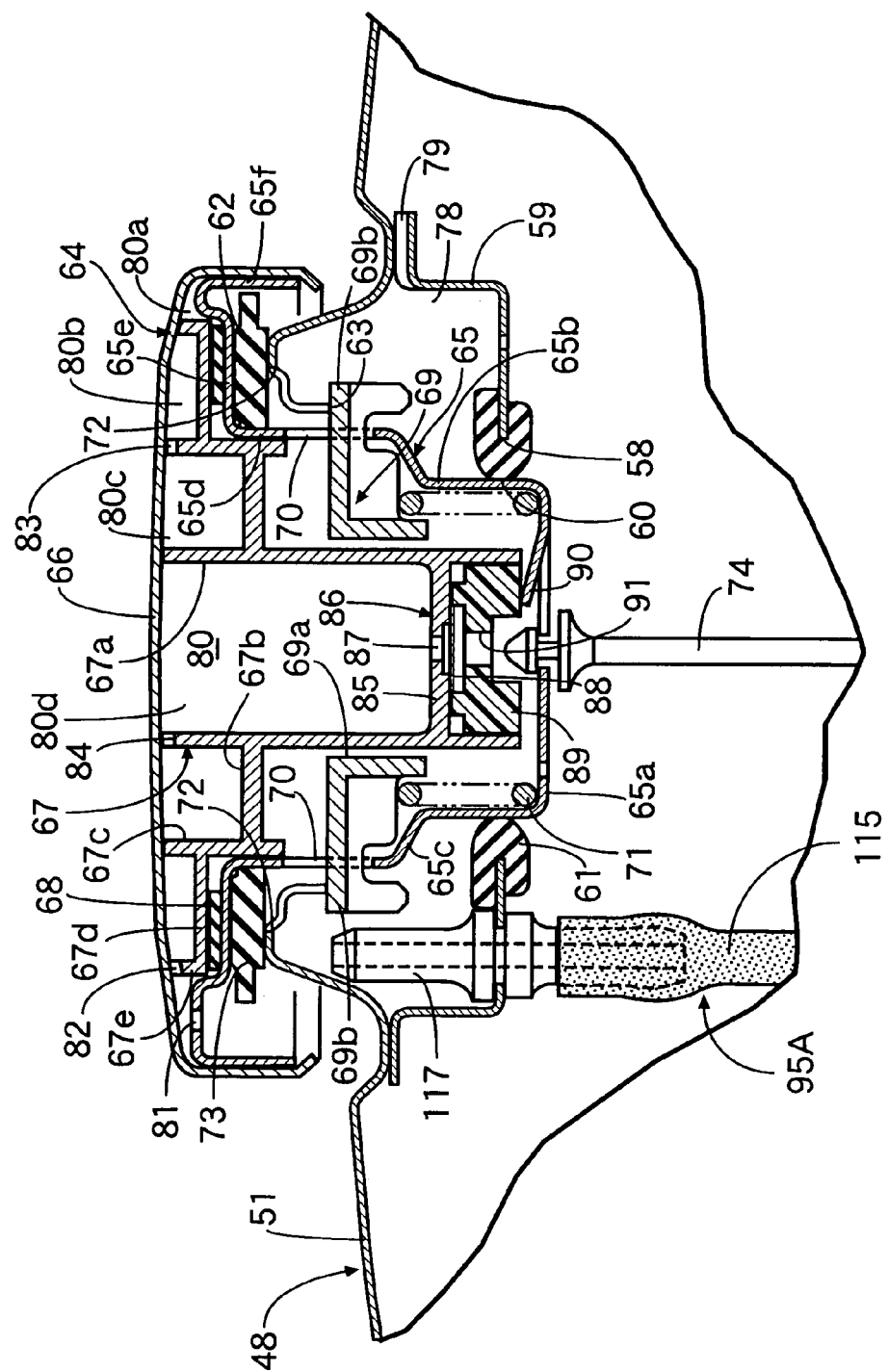
FIG. 4 is an enlarged view of an upper part of the fuel tank shown in FIG. 3 as well as a removable tank cap.

Referring also to FIG. 4, a seal support member 59 is welded to a central part of an inner face of the upper tank half 51 of the fuel tank 48. A central part of the seal support member 59 has a seal-mounting hole 58. An annular seal 61 is mounted in the seal-mounting hole 58 to form a fuel filler hole 60 by means of an inner periphery of the seal 61. Furthermore, integrally formed with the central part of the upper tank half 51, at a position corresponding to the seal support member 59, are a sealing portion 62 and a tubular latching portion 63. The sealing portion 62 protrudes upward into a ring shape. The tubular latching portion 63 is connected to the inner periphery of the sealing portion 62 and extends downward.

The fuel filler hole 60 is closed with a removable tank cap 64. The tank cap 64 includes an insertion tube 65, a dish-shaped operating member 66, and a support tube 67 held between the insertion tube 65 and the operating member 66. The insertion tube 65 is removably inserted into the fuel filler hole 60. The operating member 66 is joined to the upper end of the insertion tube 65.

The insertion tube 65 is integrally formed from a bottomed small-diameter cylindrical portion 65b, a tapered portion 65c, a large-diameter cylindrical portion 65d, a flange portion 65e, and a mating tubular portion 65f. The small-diameter cylindrical portion 65b has a lower end closed by an end wall 65a. The tapered portion 65c has a small-diameter end coaxially connected to the other end of the small-diameter cylindrical portion 65b. The large-diameter cylindrical portion 65d is coaxially connected to the large-diameter end of the tapered portion 65c. The flange portion 65e extends radially outward from the upper end of the large-diameter cylindrical portion 65d. The mating tubular portion 65f extends from the outer periphery of the flange portion 65e to the side on which the mating tubular portion 65f coaxially surrounds the large-diameter cylindrical portion 65d. The small-diameter cylindrical portion 65b is inserted into the fuel filler hole 60 while being in resilient sliding contact with the seal 61.

The mating tubular portion 65f of the insertion tube 65 is fitted into the dish-shaped operating member 66. The operating member 66 is joined to the upper end of the insertion tube 65 by swaging an open edge of the operating member 66 to engage the tip of the mating tubular portion 65f.

The support tube 67 integrally includes a first cylindrical portion 67a, a first connecting collar portion 67b, a second cylindrical portion 67c, a second connecting collar portion 67d, and a third cylindrical portion 67e. The first cylindrical portion 67a is coaxially disposed within the small-diameter cylindrical portion 65b of the insertion tube 65. The first connecting collar portion 67b projects radially outward from a middle portion close to the upper end of the first cylindrical portion 67a. The second cylindrical portion 67c is fitted into the large-diameter cylindrical portion 65d of the insertion tube 65 to coaxially surround the first cylindrical portion 67a and is connected to the outer periphery of the first connecting collar portion 67b. The second connecting collar portion 67d projects radially outward from a middle portion close to the upper end of the second cylindrical portion 67c. The third cylindrical portion 67e is connected to the outer periphery of the second connecting collar portion 67d to coaxially surround the second cylindrical portion 67c. Upper ends of the first to the third cylindrical portions 67a, 67c, and 67e abut against the closed end of the operating member 66.

An annular spacer 68, which is made of an elastic material, is held between the second connecting collar portion 67d of the support tube 67 and the flange portion 65e of the insertion tube 65. By swaging the open edge of the operating member 66 to engage the mating tubular portion 65f of the insertion tube 65, the operating member 66 is joined to the upper end of the insertion tube 65, and the support tube 67 is held between the insertion tube 65 and the operating member 66.

An engagement member 69 is slidably supported in the first cylindrical portion 67a of the support tube 67 beneath the first connecting collar portion 67b. The engagement member 69 integrally includes a cylindrical boss 69a and a pair of engagement arms 69b. The cylindrical boss 69a is fitted around the first cylindrical portion 67a. The engagement arms 69b extend on opposite sides from the boss 69a and away from an outer diameter of the first cylindrical portion 67a. A pair of slits 70 provided in the large-diameter cylindrical portion 65d of the insertion tube 65 extends in the axial direction. The engagement arms 69b extend through the slits 70. That is, the engagement member 69 is mounted on the tank cap 64 to prevent the engagement member 69 from pivoting around an axis of the engagement member 69 by the two slits 70 and an axial sliding range of the engagement member 69 is restricted by longitudinally opposite ends of the slits 70. A spring 71 is provided under compression between the end wall 65a of the insertion tube 65 and the engagement member 69, wherein the spring 71 exhibits a spring force urging the engagement member 69 toward the first connecting collar portion 67b of the support tube 67.

Tips of the engagement arms 69b project from the large-diameter cylindrical portion 65d of the insertion tube 65. A pair of cutouts 72 is formed in the latching portion 63 of the fuel tank 48. The tips of the engagement arms 69b are removably inserted into the cutouts 72. The latching portion 63 is formed so that, in a process in which the tank cap 64 is pivoted in one direction through a predetermined angle while the tips of the engagement arms 69b are inserted into the two cutouts 72, the latching portion 63 pushes the engagement member 69 to compress the spring 71. When the tank cap 64 is pivoted through the predetermined angle, the latching portion 63 engages the engagement arms 69b, resiliently urged by the spring 71, to maintain a state in which the tank cap 64 is mounted on the fuel tank 48.

A ring-shaped gasket 73 is fitted around the outer periphery of the large-diameter cylindrical portion 65d of the insertion tube 65. In a state in which the tank cap 64 is mounted on the fuel tank 48, the gasket 73 is held between the sealing portion 62 of the fuel tank 48 and the flange portion 65e of the insertion tube 65.

An upper end portion of a strap 74 is retained on the end wall 65a of the insertion tube 65. The lower end of the strap 74 is integrally formed with a hook 75 wherein the hook 75 does not easily pass through the filler opening 60. Therefore, when the tank cap 64 is detached from the fuel tank 48, the hook 75 catches onto the seal support member 59 at the peripheral edge of the fuel filler hole 60, thus preventing the tank cap 64 from falling off.

In a state in which the tank cap 64 is mounted on the fuel tank 48, an annular fuel vapor passage 78 is formed by the sealing portion 62 of the fuel tank 48, the seal support member 59, and the tank cap 64 to surround the tank cap 64. A channel 79 is provided on the seal support member 59 to form a passage that provides communication between the fuel vapor passage 78 and the interior of the fuel tank 48. The channel 79 is formed between the seal support member 59 and an inner face of the upper tank half 51. That is, the fuel vapor passage 78 communicates with the interior of the fuel tank 48.

An external communication passage 80 that communicates with the outside is formed between the operating member 66 and the support tube 67 of the tank cap 64. The external communication passage 80 includes a first annular passage portion 80a, a second annular passage portion 80b, a third annular passage portion 80c, and a central passage portion 80d. The first annular passage portion 80a is formed between the flange portion 65e of the insertion tube 65 and the operating member 66 outside the third cylindrical portion 67e of the support tube 67. The second annular passage portion 80b is formed between the second and third cylindrical portions 67c and 67e of the support tube 67. The third annular passage portion 80c is formed between the second and first cylindrical portions 67c and 67a of the support tube 67. The central passage portion 80d is formed within the first cylindrical portion 67a of the support tube 67.

An external communication hole 81, providing communication between the first annular passage portion 80a and the outside, is provided in the flange portion 65e of the insertion tube 65. A communication channel 82, providing communication between the first and second annular passage portions 80a and 80b, is provided at the upper end of the third cylindrical portion 67e of the support tube 67. A communication channel 83, providing communication between the second and third annular passage portions 80b and 80c, is provided at the upper end of the second cylindrical portion 67c of the support tube 67. A communication channel 84, providing communication between the third annular passage portion 80c and the central passage portion 80d, is provided at the upper end of the first cylindrical portion 67a of the support tube 67.

A partition 85 defining the lower end of the central passage portion 80d of the external communication passage 80 is integrally provided with the inner periphery of a portion close to the lower end of the first cylindrical portion 67a of the support tube 67 to divide the interior of the first cylindrical portion 67a into upper and lower parts.

A one-way valve 86 is provided within the tank cap 64 and opens when the pressure of the interior of the fuel tank 48 is lower than the external pressure to provide communication between the external communication passage 80 and the interior of the fuel tank 48. The one-way valve 86 includes a valve hole 87 and a leaf valve member 88. The valve hole 87 is provided in a central part of the partition 85 and coaxially extends from the lower end of the central passage portion 80d of the external communication passage 80. The leaf valve member 88 is capable of closing the valve hole 87 by being seated on the central part of the partition 85 from the side opposite the central passage portion 80d.

A blocking member 89 is fitted into a lower end part of the first cylindrical portion 67a. The state in which the blocking member 89 is fitted into the first cylindrical portion 67a is maintained by making a support piece 90 abut against the blocking member 89, wherein the support piece 90 is formed by cutting and raising a part of the end wall 65a of the insertion tube 65.

A passage 91, communicating with the interior of the fuel tank 48, is provided in a central part of the blocking member 89, wherein the interior pressure of the fuel tank 48 acts on the valve member 88 from the side opposite the partition 85. The gap between the blocking member 89 and the partition 85 is set to allow opening and closing operations of the valve member 88 which is housed between the blocking member 89 and the partition 85.

Fuel vapor evaporated within the fuel tank 48 and guided to the fuel vapor passage 78 is then guided to a canister 96 by a charge pipeline 95A. The fuel vapor desorbed from the canister 96 is guided into the intake pipe 23 of the intake system 21 via a purge pipeline 97. The canister 96 is disposed to one side of the crankcase 12 and beneath the cylinder block 13 having the upwardly inclined cylinder axis C.

Figure 5:
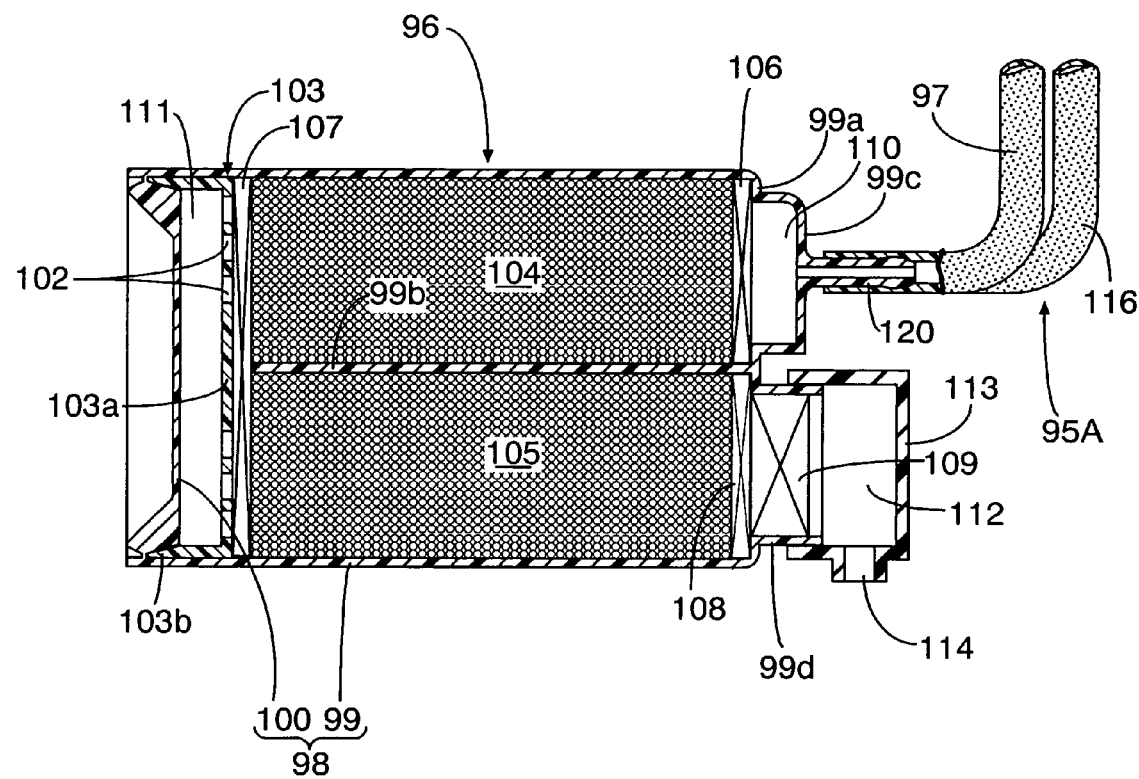
FIG. 5 is an enlarged sectional view of a canister taken along line 5—5 in FIG. 1.

In FIG. 5, a casing 98 of the canister 96 has an axis that is substantially parallel to the crankshaft 18 rotatably supported by the crankcase 12 of the engine main body 11. The casing 98 is formed from a synthetic resin and has a bottomed cylindrical casing main body 99 and a cover 100. The casing main body 99 has an end wall 99a at one end and an opening at the other end. The cover 100 is welded to the casing main body 99 to close the opening.

The intake system 21 and the exhaust system 41 are connected to mutually opposite sides of the cylinder head 14 of the engine main body 11. The casing 98 is disposed so that the end wall 99a of the casing main body 99 faces the intake system 21 side. The cylinder block 13 includes a heat shielding cover 101, which covers the cylinder block 13 from below and is disposed between the cylinder block 13 and the canister 96. The casing 98 is fixedly supported by the heat shielding cover 101.

A partition wall 99b is integrally provided with an inner face of the casing main body 99 and the end wall 99a. The partition wall 99b has one end connected to the end wall 99a and extends toward the cover 100 to divide the interior of the casing main body 99 into upper and lower portions. A support member 103 is fitted into and fixed to the other end of the casing main body 99 to form a middle chamber 111 between the support member 103 and the cover 100. The support member 103 integrally has a disc portion 103a having a plurality of through holes 102, and a cylindrical portion 103b having one end thereof connected to the outer periphery of the disc portion 103a and extending toward the cover 100. The other end of the cylindrical portion 103b, which is fitted into the other end of the casing main body 99, is held between the cover 100 and the casing main body 99.

An upper adsorbent layer 104 packed with an adsorbent, such as, for example, activated carbon, is housed and held within the casing main body 99 above the partition wall 99b. A filter 106 is disposed between the upper adsorbent layer 104 and the end wall 99a and a filter 107 is disposed between the upper adsorbent layer 104 and the disc portion 103a of the support member 103. A lower adsorbent layer 105 packed with an adsorbent, such as, for example, activated carbon, is housed and held within the casing main body 99 beneath the partition wall 99b. The filter 107 is disposed between the lower adsorbent layer 105 and the disc portion 103a of the support member 103. The filter 108 is disposed between the lower adsorbent layer 105 and the end wall 99a.

An expanded portion 99c which forms an introduction chamber 110 between the expanded portion 99c and the filter 106 is integrally provided with the end wall 99a above the partition wall 99b and protrudes outward. A connecting tubular portion 99d having a filter 109 fitted and housed therewithin is integrally provided with the end wall 99a beneath the partition wall 99b and protrudes outward. A cap 113 is fitted onto the connecting tubular portion 99d to form a discharge chamber 112 between the cap 113 and the filter 109. The cap 113 is provided with an external communication hole 114 which communicates with the discharge chamber 112 and opens downward.

Connected to the expanded portion 99c are the charge pipeline 95A, which guides the fuel vapor from the fuel tank 48, and the purge pipeline 97, which guides the fuel vapor that has desorbed from the canister 96 to the intake pipe 23. The fuel vapor that has evaporated in the fuel tank 48 when the engine is stopped is fed from the charge pipeline 95A into the introduction chamber 110 and flows toward the discharge chamber 112 via the filter 106, the upper adsorbent layer 104, the filter 107, the through holes 102 of the support member 103, the middle chamber 111, the through holes 102 of the support member 103, the filter 107, the lower adsorbent layer 105, and the filters 108 and 109. The fuel vapor is adsorbed by the upper and lower adsorbent layers 104 and 105.

When the engine is running, air fed into the discharge chamber 112 through the external communication hole 114 flows toward the intake pipe 23 via the filters 109 and 108, the lower adsorbent layer 105, the filter 107, the through holes 102 of the support member 103, the middle chamber 111, the through holes 102 of the support member 103, the filter 107, the upper adsorbent layer 104, the filter 106, the introduction chamber 110, and the purge pipeline 97. The fuel vapor desorbed from the lower adsorbent layer 105 and the upper adsorbent layer 104 is guided to the intake pipe 23 side accompanied by the air.

In this way, the interior of the casing 98 of the canister 96 is divided into upper and lower portions by the partition wall portion 99b, and the fuel vapor or the air accompanying the fuel vapor flows, sequentially, past the upper adsorbent layer 104 above the partition wall portion 99b and the lower adsorbent layer 105 beneath the partition wall portion 99b. Therefore, it is possible to increase the adsorption length while keeping the casing 98 compact, as well as improving adsorption efficiency.

The charge pipeline 95A includes a pipeline 115 and a pipeline 116. The pipeline 115 is formed between the tank cap 64 and the fuel tank 48 and has one end communicating with the fuel vapor passage 78 which communicates with the interior of the fuel tank 48. The pipeline 116 provides a connection between the pipeline 115 and the canister 96. The pipelines 115 and 116 are, for example, rubber hoses.

A connecting pipe 117 vertically extends through the seal support member 59 of the fuel tank 48 on the side opposite the canister 96 relative to the axis of the tank cap 64. A middle portion of the connecting pipe 117 is mounted on the seal support member 59, wherein the upper end of the connecting pipe 117 communicates with the fuel vapor passage 78, and the lower end of the connecting pipe 117 is connected to the upper end of the pipeline 115. A vertically extending connecting pipe 118 passes through the base of the lower tank half 52 of the fuel tank 48 in a liquid-tight manner. A middle portion of the connecting pipe 118 is mounted on the base of the lower tank half 52. The upper end of the connecting pipe 118 is connected to the lower end of the pipeline 115. The pipeline 116 extends through the support cover 53 and has one end connected to the lower end of the connecting pipe 118.

That is, the pipeline 115, forming a part of the charge pipeline 95A, is disposed within the fuel tank 48 while extending through the interior of the fuel tank 48 to communicate with the fuel vapor passage 78 on the side opposite the canister 96 relative to the axis of the tank cap 64.

A pair of connecting pipe portions 119 and 120 are provided side-by-side on the expanded portion 99c of the canister 96. The other end of the pipeline 116 is connected to one connecting pipe portion 119. One end of the purge pipeline 97 is connected to the other connecting pipe portion 120. The other end of the purge pipeline 97 is connected to a connecting pipe portion 35b which is integral with the pipe 35 of the intake pipe 23.

Referring again to FIG. 3, mounted on the base of the lower tank half 52 of the fuel tank 48 is a filter case 93 provided with a filter 92 for filtering fuel within the fuel tank 48. A fuel hose 94 which guides the fuel to the carburetor 22 is connected to the filter case 93.

The operation of the first embodiment is now described.

The engine main body 11 includes the crankcase 12 and the cylinder block 13 joined to the crankcase 12 and has the upwardly inclined cylinder axis C. The canister 96 for adsorbing fuel vapor evaporated within the fuel tank 48 is disposed on one side of the crankcase 12 and beneath the cylinder block 13.

That is, an empty space is formed beneath the cylinder block 13 as a result of the cylinder axis C being inclined upward. Since the canister 96 is disposed in the empty space, it is possible to arrange the canister 96 therein without increasing the overall dimensions of the general-purpose engine. Moreover, the overall dimensions of the general-purpose engine do not increase even if the capacity of the canister 96 is increased. Thus, it is possible to improve the adsorption properties of the canister 96 while avoiding any increase in the overall dimensions of the general-purpose engine.

Furthermore, the engine main body 11 includes the cylinder head 14 joined to the head portion of the cylinder block 13 wherein the intake system 21 and the exhaust system 41 are connected to mutually opposite sides of the cylinder head 14. Also, the charge pipeline 95A, which guides the fuel vapor from the fuel tank 48, and the purge pipeline 97, which guides the fuel vapor desorbed from the canister 96, are connected to a portion of the casing 98 of the canister 96 facing the intake system 21 side. Therefore, the charge pipeline 95A and the purge pipeline 97 are connected to the casing 98 of the canister 96 on the intake side where exhaust heat from the engine main body 11 has little influence, and it is thus possible to prevent the exhaust heat from affecting adsorption and desorption of fuel vapor in the canister 96, wherein the efficiency of the canister 96 is improved.

Moreover, the fuel vapor passage 78, communicating with the interior of the fuel tank 48, is formed between the fuel tank 48 and the tank cap 64 mounted onto the fuel tank 48. Also, the pipeline 115, which forms a part of the charge pipeline 95A for guiding the fuel vapor from the interior of the fuel tank 48 to the canister 96 and has one end communicating with the fuel vapor passage 78, is arranged within the fuel tank 48 and extends through the interior of the fuel tank 48. Therefore, it is possible to reduce the portion of the charge pipeline 95A exposed to the outside; reduce the overall dimensions of the general-purpose engine, and consequently, the dimensions of the work machine; enhance the ease of mounting and the appearance of the general-purpose engine; improve the salability; and enhance the safety, while taking into consideration the leakage of fuel vapor, damage to the pipelines, etc.

Furthermore, the pipeline 115, forming a part of the charge pipeline 95A, communicates with the fuel vapor passage 78 on the side opposite the canister 96 relative to the axis of the tank cap 64. Therefore, when the fuel tank 48 is tilted with the canister 96 side down, the flow of fuel into the pipeline 115 is avoided. When the fuel tank 48 is tilted with the canister 96 side up, although there is a possibility that fuel might flow into the pipeline 115, since the canister 96 has a relatively high position, the flow of fuel into the canister 96 is suppressed. As a result, even when the fuel tank 48 is tilted, it is possible to prevent the fuel from flowing permanently into the canister 96.

Furthermore, the one-way valve 86, which opens when the pressure within the fuel tank 48 is lower than the external pressure to provide communication between the external communication passage 80 and the interior of the fuel tank 48, is provided within the tank cap 64. Therefore, even when the airflow resistance of a route from the charge pipeline 95A through the canister 96 to the intake system 21 is increased due to the adsorption of the fuel vapor or the build up of impurities in the canister 96, it is possible, by means of the operation of the one-way valve 86, to prevent the pressure within the fuel tank 48 from becoming negative, thereby smoothly supplying the fuel from the fuel tank 48 even if the fuel level within the fuel tank 48 decreases.

Figure 6:
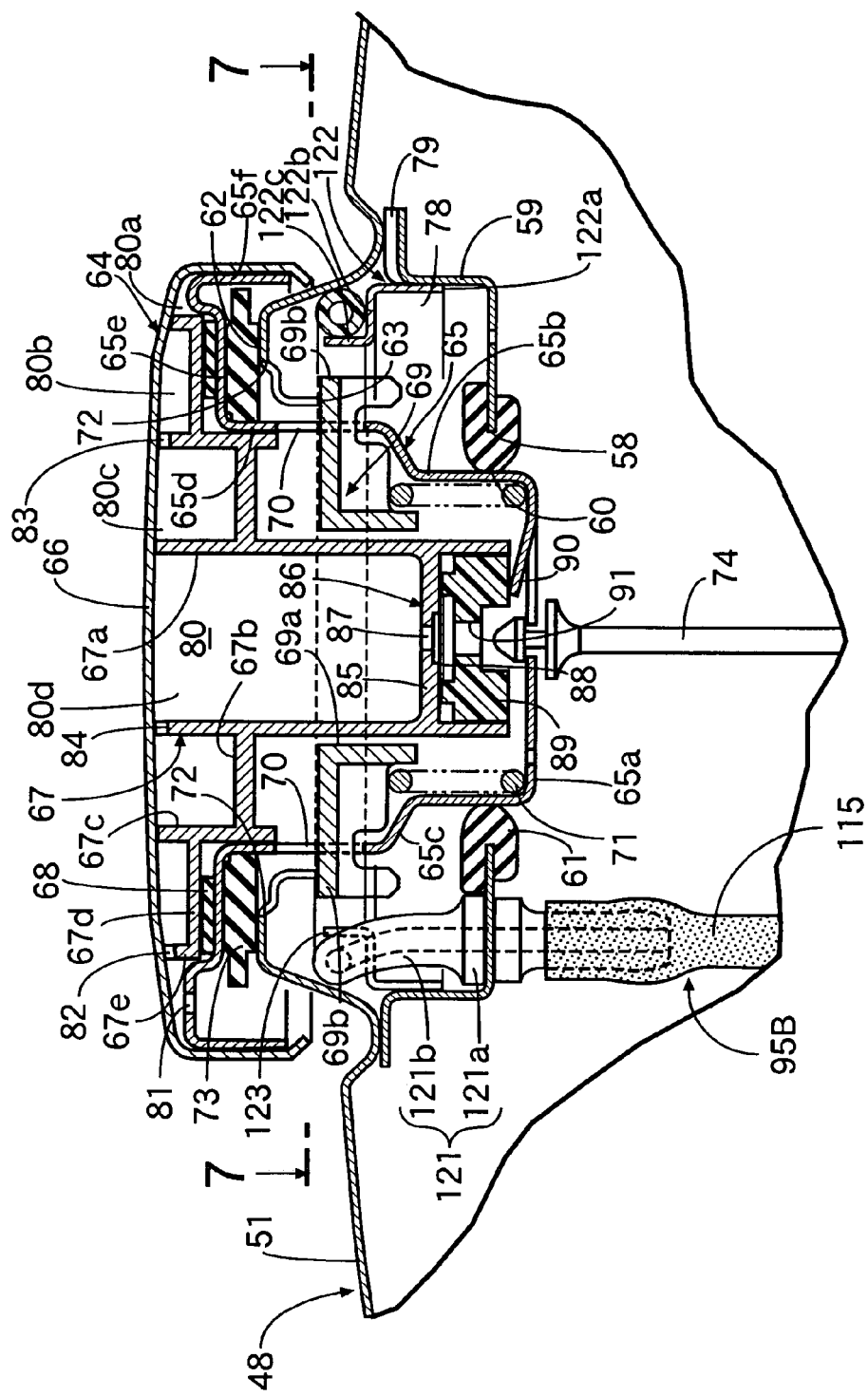
FIG. 6 is a vertical sectional view of an upper part of a fuel tank and a removable tank cap according to an alternate embodiment of the present invention.
Figure 7:
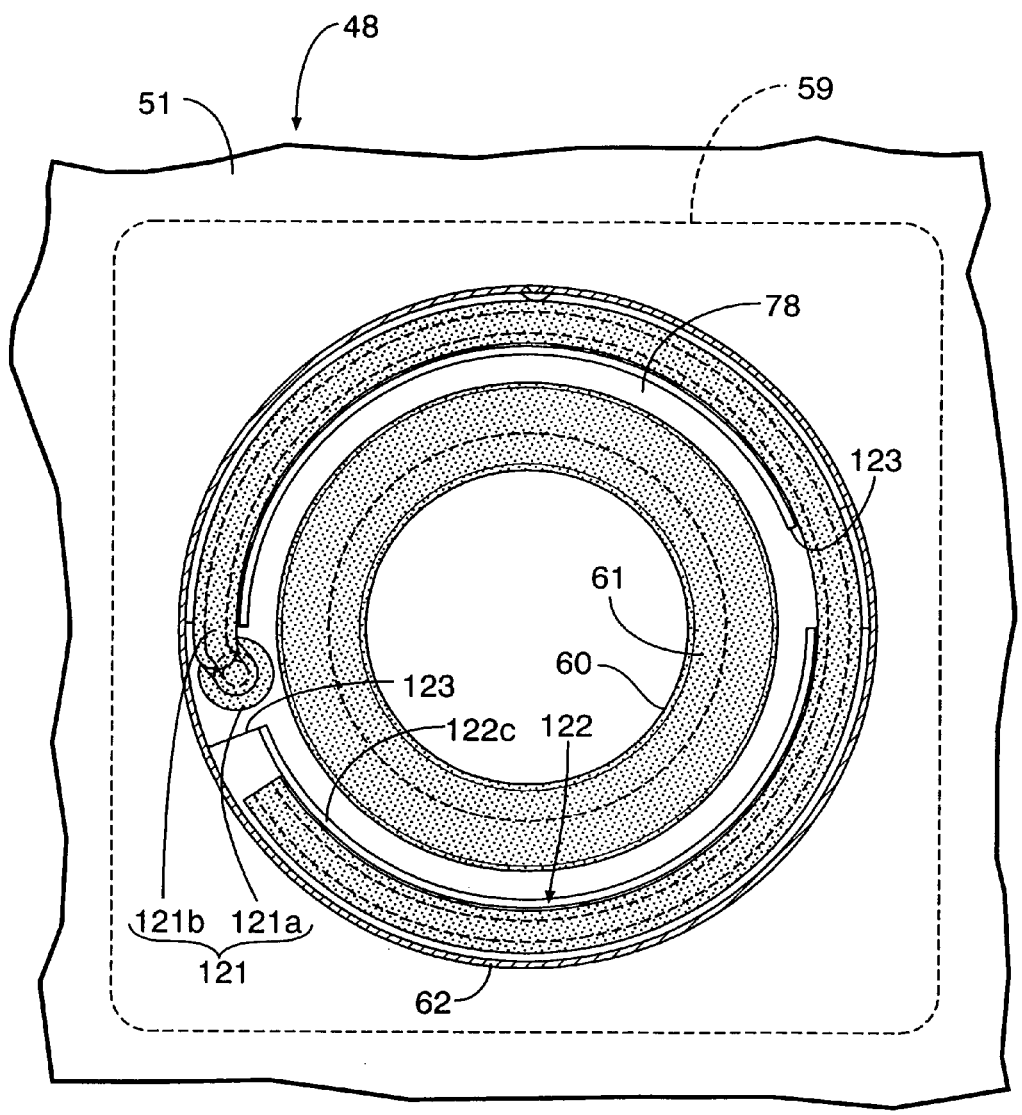
FIG. 7 is a sectional view of the fuel tank taken along line 7—7 in FIG. 6.

A second embodiment of the present invention is now described with reference to FIG. 6 and FIG. 7.

Part of a charge pipeline 95B, which guides fuel vapor evaporated within a fuel tank 48 to a canister 96, is formed from a pipeline 115 disposed within the fuel tank 48 and extends through the interior of the fuel tank 48 and a synthetic resin pipeline 121 which is connected to the upper end of the pipeline 115.

The pipeline 121 is formed from a connecting pipe portion 121a and an extension tubular portion 121b. The connecting pipe portion 121a is mounted on a seal support member 59 of the fuel tank 48 on the side opposite the canister 96 relative to the axis of a tank cap 64. The extension tubular portion 121b is integrally connected to the connecting pipe portion 121a and disposed within a fuel vapor passage 78.

The connecting pipe portion 121a is mounted on the seal support member 59 so that a lower end projects downward from the seal support member 59. The upper end of the pipeline 115 is connected to the lower end of the connecting pipe portion 121a.

The extension tubular portion 121b has one end integrally connected to the upper end of the connecting pipe portion 121a and is bent into an arc shape to be arranged along substantially the entire circumference within the annular fuel vapor passage 78 with an opening at the other end of the extension tubular portion 121b reaching the vicinity of the connecting pipe portion 121a.

Fixedly attached to an inner face of the seal support member 59 is a support member 122 for retaining the extension tubular portion 121b of the pipeline 21. The support member 122 includes a support tube portion 122a fitted into, and fixed to, the inner face of the seal support member 59, a support collar portion 122b projecting radially inward from the upper end of the support tube portion 122a, and an inner periphery restraining tube portion 122c rising upward from the inner periphery of the support collar portion 122b. The extension tubular portion 121b of the pipeline 121 is placed on, and supported by, the support collar portion 122b, while an inner peripheral side of the extension tubular portion 121b arranged into an arc shape is restrained by the inner periphery restraining tube portion 122c.

Provided in the support member 122 is a pair of cutouts 123 formed by cutting away parts of the support collar portion 122b and the inner periphery restraining tube portion 122c, wherein the cutouts 123 are positioned on one diameter. A portion at the one end of the extension tubular portion 121b that rises from the connecting pipe portion 121a is positioned in one of the cutouts 123.

In accordance with the second embodiment, when the fuel tank 48 is tilted with the canister 96 side down, since the opening at the other end of the extension tubular portion 121b is at a high position, the flow of fuel into the pipeline 121 is avoided. When the fuel tank 48 is tilted with the canister 96 side up, although there is a possibility that the fuel might flow into the opening at said other end of the extension tubular portion 121b, since the extension tubular portion 121b is bent into the arc shape, the fuel will not flow from the pipeline 121 into the pipeline 115. Therefore, it is possible to prevent the fuel from flowing into the canister 96 even when the fuel tank 48 is tilted.

Figure 8:
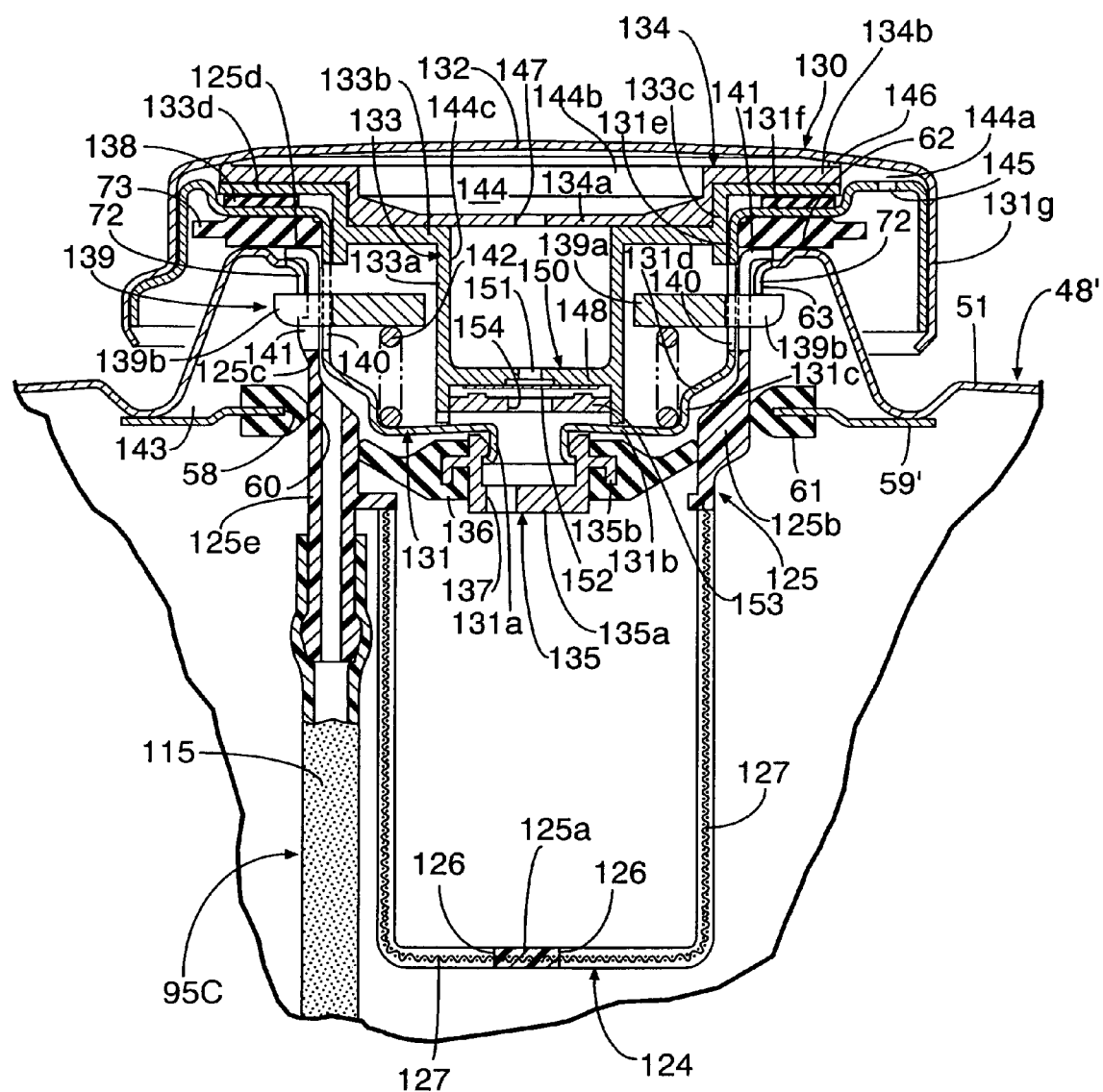
FIG. 8 is a vertical sectional view of an upper part of a fuel tank and a tank cap according to a third embodiment of the present invention.

A third embodiment of the present invention is now described with reference to FIG. 8.

A seal support member 59' is welded to a central part of an inner face of an upper tank half 51 of a fuel tank 48'. A central part of the seal support member 59' has a seal-mounting hole 58 therein. Mounted in the seal-mounting hole 58 is an annular seal 61, which forms a fuel filler hole 60 with an inner periphery of the seal 61. A sealing portion 62 and a tubular latching portion 63 are integrally formed with the central part of the upper tank half 51 at a position corresponding to the seal support member 59'. The sealing portion 62 protrudes upward into a ring shape. The latching portion 63 is connected to the inner periphery of the sealing portion 62 and extends downward.

A filter unit 124 is inserted into an upper part of the fuel tank 48' wherein the upper end of the filter unit 124 is engaged with a connecting part between the sealing portion 62 and the latching portion 63. A casing 125 of the filter unit 124 is formed from a synthetic resin and integrally includes: a filter support tube portion 125a having a bottomed cylindrical shape with an open upper end; a sealing tube portion 125b connected to the upper end of the filter support tube portion 125a and inserted into the fuel filler hole 60 to be in resilient contact with the seal 61; a support tube portion 125c that extends upward from the upper end of the sealing tube portion 125b and is inserted into the latching portion 63; and an engagement collar portion 125d projecting radially outward from the upper end of the support tube portion 125c. The engagement collar portion 125d engages from above with the connecting part between the sealing portion 62 and the latching portion 63.

Provided in the filter support tube portion 125a of the casing 125 are a plurality of openings 126 extending from the side face to the base of the filter support tube portion 125a. Mesh filters 127 are disposed in the openings 126 and are supported by the filter support tube portion 125a.

A tank cap 130 includes: an insertion tube 131 that is removably inserted into an upper part of the casing 125 of the filter unit 124; a disc-shaped operating member 132 joined to the upper end of the insertion tube 131; a support tube 133 that is inserted into, and fixed to, an upper part of the insertion tube 131; a retaining member 134 that is held between the support tube 133 and the operating member 132; a seal support piece 135 fixed to the lower end of the insertion tube 131; and a ring-shaped seal 136 that is mounted on the seal support piece 135 and removably inserted into the sealing tube portion 125b of the casing 125 in resilient contact therewith.

The seal support piece 135 integrally includes a bottomed cylindrical portion 135a formed into a bottomed cylindrical shape with a lower end thereof closed and a mounting projection 135b projecting from the outer face of the bottomed cylindrical portion 135a and formed to have a substantially L-shaped cross-section when vertically sectioned. A through hole 137 is provided in the lower closed end of the bottomed cylindrical portion 135a. In this way, the seal 136 is attached to the seal support piece 135 to surround the bottomed cylindrical portion 135a while embedding the mounting projection 135b into the inner periphery of the seal 136.

The insertion tube 131 is integrally formed from: a cylindrical swage-joined portion 131a fitted from above into the bottomed cylindrical portion 135a of the seal support piece 135 and joined by swaging; a flat circular receiving step 131b connected to the upper end of the swage-joined portion 131a at substantially a right angle and facing upward; a small-diameter cylindrical portion 131c rising slightly upward from the outer periphery of the reception step 131b; a tapered portion 131d having a small-diameter end coaxially connected to the upper end of the small-diameter cylindrical portion 131b; a large-diameter cylindrical portion 131e coaxially connected to the large-diameter end of the tapered portion 131d; a flange portion 131f projecting radially outward from the upper end of the large-diameter cylindrical portion 131e; and a mating tubular portion 131g extending from the outer periphery of the flange portion 131f to the side where the mating tubular portion 131g coaxially surrounds the large-diameter cylindrical portion 131e.

The mating tubular portion 131g of the insertion tube 131 is fitted into the dish-shaped operating member 132. The operating member 132 is joined to the upper end of the insertion tube 131 by swaging an open edge of the operating member 132 wherein the operating member 132 engages the tip of the mating tubular portion 131g.

The support tube 133 integrally includes a first cylindrical portion 133a, a connecting collar portion 133b, a second cylindrical portion 133c, and a flange portion 133d. The first cylindrical portion 133a is coaxially disposed within the insertion tube 131. The connecting collar portion 133b projects radially outward from the upper end of the first cylindrical portion 133a. The second cylindrical portion 133c is fitted into the large-diameter cylindrical portion 131e of the insertion tube 131 and connected to the outer periphery of the connecting collar portion 133b. The flange portion 133d projects radially outward from the upper end of the second cylindrical portion 133c.

The retaining member 134 is integrally formed from a bottomed cylindrical portion 134a fitted from above into the second cylindrical portion 133c of the support tube 133 and a flange portion 134b projecting radially outward from the upper end of the bottomed cylindrical portion 134a.

The retaining member 134 is held between the support tube 133 and the operating member 132 so that the flange portion 134b is disposed between the flange portion 133d of the support tube 133 and the operating member 132. By swaging the open edge of the operating member 132 wherein the operating member 132 engages the mating tubular portion 131g of the insertion tube 131 while an annular spacer 138, which is made from a resilient material, is held between the flange portion 133d of the support tube 133 and the flange portion 131f of the insertion tube 131. The upper end of the insertion tube 131 is joined to the operating member 132. Also, the spacer 138, the upper end of the support tube 133, and the retaining member 134 are held between the operating member 132 and the support tube 133.

An engagement member 139 is slidably supported in a vertical manner within the tank cap 130. The engagement member 139 is integrally formed from a ring plate 139a, surrounding the first cylindrical portion 133a of the support tube 133, and a pair of engagement arms 139b extending to opposite sides from the ring plate 139a on one diameter of the ring plate 139a. The large-diameter cylindrical portion 131e of the insertion tube 131, the support tube portion 125c, and the engagement collar portion 125d of the casing 125 are each provided with a pair of slits 140 and 141 that extend in the axial direction, wherein the engagement arms 139b extend through the slits 140 and 141. That is, the engagement member 139 is mounted on the tank cap 130 so that the engagement member 139 is prevented from pivoting around an axis by the slits 140 and 141, and an axial sliding range of the engagement member 139 is restricted by longitudinally opposite ends of the slits 140 and 141. A spring 142 is provided under compression between the receiving step 131b of the insertion tube 131 and the ring plate 139a of the engagement member 139, wherein the spring 142 exhibits a spring force urging the engagement member 139 toward the first connecting collar portion 133b of the support tube 133.

Tips of the engagement arms 139b project from the support tube portion 125c of the casing 125. A pair of cutouts 72 is formed in the latching portion 63 of the fuel tank 48'. The tips of the engagement arms 139b are removably inserted into the cutouts 72. The latching portion 63 is formed so that: in a process in which the tank cap 130 is pivoted in one direction through a predetermined angle while the tips of the engagement arms 139b are inserted into the two cutouts 72, the latching portion 63 pushes the engagement member 139 so as to compress the spring 142. When the tank cap 130 is pivoted through the predetermined angle, the latching portion 63 engages with the engagement arms 139b resiliently urged by the spring 142, thereby maintaining the state in which the tank cap 130 is mounted on the fuel tank 48'.

A ring-shaped gasket 73 is fitted around the outer periphery of the large-diameter cylindrical portion 131e of the insertion tube 131. In the state in which the tank cap 130 is mounted on the fuel tank 48', the gasket 73 is held between the sealing portion 62 of the fuel tank 48' and the flange portion 131f of the insertion tube 131.

In the state in which the tank cap 130 is mounted on the fuel tank 48', a fuel vapor passage 143 is formed between the support tube 133 of the tank cap 130 and the sealing portion 62 and the seal support member 59' of the fuel tank 48'. The fuel vapor passage 143 communicates with the interior of the fuel tank 48' via the through hole 137 provided in the seal support piece 135 and the filters 127.

An external communication passage 144 that communicates with the outside is formed between the operating member 132, the support tube 133, and the retaining member 134 of the tank cap 130. This external communication passage 144 includes: an annular passage portion 144a formed outside the spacer 138 between the operating member 132 and the flange portions 131f, 133d, and 134b of the insertion tube 131, the support tube 133, and the retaining member 134; a passage portion 144b formed between the retaining member 134 and the operating member 132; and a central passage portion 144c formed within the first cylindrical portion 133a of the support tube 133.

The flange portion 131f of the insertion tube 131 is provided with an external communication hole 145 providing communication between the annular passage portion 144a and the outside. The outer edge of the flange portion 134b is provided with a communication channel 146 which provides communication between the annular passage portion 144a and the passage portion 144b. The closed end of the bottomed cylindrical portion 134a is provided with a through hole 147 which provides communication between the passage portion 144b and the central passage portion 144c.

A partition 148 defining the lower end of the central passage portion 144c of the external communication passage 144 is integrally provided with the inner periphery of a portion close to the lower end of the first cylindrical portion 133a of the support tube 133 to divide the interior of the first cylindrical portion 133a into upper and lower parts.

A one-way valve 150 is provided within the tank cap 130 and opens when the pressure of the interior of the fuel tank 48' is lower than the external pressure to provide communication between the external communication passage 144 and the interior of the fuel tank 48'. The one-way valve 150 includes a valve hole 151 and a leaf valve member 152. The valve hole 151 is provided in a central part of the partition 148 so that the valve hole 151 coaxially extends from the lower end of the central passage portion 144c. The leaf valve member 152 is capable of closing the valve hole 151 when seated on the central part of the partition 148 from the side opposite the central passage portion 144c.

A blocking member 153 is fitted into, and fixed to, a lower end portion of the first cylindrical portion 133a. A passage 154, communicating with the fuel vapor passage 143, is provided in a central part of the blocking member 153 so that the pressure of the interior of the fuel vapor passage 143, that is, the pressure of the interior of the fuel tank 48', acts on the valve member 152 from the side opposite the partition 148. The gap between the blocking member 153 and the partition 148 is set to allow opening and closing operations of the valve member 152 which is housed between the blocking member 153 and the partition 148.

The fuel vapor that has evaporated within the fuel tank 48' and has been guided to the fuel vapor passage 143 is further guided by a charge pipeline 95C to a canister 96. The upper end of a pipeline 115, forming a part of the charge pipeline 95C and extending through the interior of the fuel tank 48' to be disposed within the fuel tank 48', is connected to the lower end of a connecting pipe portion 125e integrally provided with the sealing tube portion 125b of the casing 125 of the filter unit 124 so as to be connected to the fuel vapor passage 143.

In accordance with this third embodiment, the same effects as in the first embodiment can be achieved.

Although preferred embodiments of the present invention have been described above, the present invention is not limited to the above-mentioned embodiments and can be modified in a variety of ways without departing from the subject matter and/or spirit of the present invention.

What is claimed is:

1. A general-purpose engine comprising:
   an engine main body;
   a fuel tank;
   a canister which adsorbs fuel vapor that has evaporated within the fuel tank; and
   an intake system that is in communication with the engine main body, wherein the fuel vapor desorbed from the canister is guided to the intake system;
   wherein the engine main body comprises a crankcase and a cylinder block joined to the crankcase and having an upwardly inclined cylinder axis (C), and
   wherein the canister is disposed on one side of the crankcase and beneath the cylinder block.

2. The general-purpose engine according to claim 1, wherein the engine main body further comprises a cylinder head joined to a head portion of the cylinder block, wherein the intake system and an exhaust system are connected to mutually opposite sides of the cylinder head, and wherein a charge pipeline, which guides the fuel vapor from the fuel tank, and a purge pipeline, which guides the fuel vapor desorbed from the canister, are connected to a part of a canister casing facing the intake system.

3. The general-purpose engine according to claim 1, wherein the fuel tank includes a removable tank cap and a fuel vapor passage in communication with an interior of the fuel tank being formed between the tank cap and the fuel tank, and wherein a pipeline that forms a part of a charge pipeline, which guides the fuel vapor from the interior of the fuel tank to the canister and has one end connected to the fuel vapor passage, is arranged within the fuel tank and extends through the interior of the fuel tank.

4. The general-purpose engine according to claim 3, wherein an external communication passage that communicates with the outside is formed within the tank cap, and wherein a one-way valve that opens when a pressure within the fuel tank is lower than an external pressure to provide communication between the external communication passage and the interior of the fuel tank, is provided within the tank cap.

* * * * *